US012211486B2

United States Patent
Ray et al.

(10) Patent No.: US 12,211,486 B2
(45) Date of Patent: Jan. 28, 2025

(54) APPARATUS AND METHOD FOR COMPOSITIONAL SPOKEN LANGUAGE UNDERSTANDING

(71) Applicant: Samsung Electronics Co., Ltd., Suwon-si (KR)

(72) Inventors: Avik Ray, Sunnyvale, CA (US); Yilin Shen, Santa Clara, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 17/647,499

(22) Filed: Jan. 10, 2022

(65) Prior Publication Data

US 2022/0375457 A1 Nov. 24, 2022

Related U.S. Application Data

(60) Provisional application No. 63/190,695, filed on May 19, 2021.

(51) Int. Cl.
*G10L 15/06* (2013.01)
*G10L 15/14* (2006.01)
*G10L 15/22* (2006.01)

(52) U.S. Cl.
CPC ............. *G10L 15/063* (2013.01); *G10L 15/14* (2013.01); *G10L 15/22* (2013.01); *G10L 2015/0633* (2013.01); *G10L 2015/0638* (2013.01); *G10L 2015/223* (2013.01)

(58) Field of Classification Search
CPC ....... G10L 15/063; G10L 15/14; G10L 15/22; G10L 2015/0633; G10L 2015/0638; G10L 2015/223
See application file for complete search history.

(56) References Cited

U.S. PATENT DOCUMENTS

| 9,978,374 | B2 | 5/2018 | Heigold et al. |
| 10,515,625 | B1 | 12/2019 | Metallinou et al. |
| 10,600,406 | B1 | 3/2020 | Shapiro et al. |
| 11,562,735 | B1 * | 1/2023 | Gupta ................. G10L 15/1822 |
| 2019/0259380 | A1 | 8/2019 | Biyani et al. |

(Continued)

OTHER PUBLICATIONS

Jixuan Wang, Kai Wei, Martin Radfar, Weiwei Zhang, Clement Chung, "Encoding Syntactic Knowledge in Transformer Encoder for Intent Detection and Slot Filling", arXiv"2012.11689, Dec. 21, 2020 (Year: 2020).*

(Continued)

*Primary Examiner* — Pierre Louis Desir
*Assistant Examiner* — Daniel W Chung

(57) ABSTRACT

A method includes identifying multiple tokens contained in an input utterance. The method also includes generating slot labels for at least some of the tokens contained in the input utterance using a trained machine learning model. The method further includes determining at least one action to be performed in response to the input utterance based on at least one of the slot labels. The trained machine learning model is trained to use attention distributions generated such that (i) the attention distributions associated with tokens having dissimilar slot labels are forced to be different and (ii) the attention distribution associated with each token is forced to not focus primarily on that token itself.

28 Claims, 11 Drawing Sheets

(56) References Cited

U.S. PATENT DOCUMENTS

2019/0371307 A1* 12/2019 Zhao .................... G10L 15/26
2020/0410986 A1   12/2020 Shen et al.
2022/0084510 A1*  3/2022 Peng .................... G10L 15/063

OTHER PUBLICATIONS

Chen et al., "Compositional Generalization via Neural-Symbolic Stack Machines", 34th Conference on Neural Information Processing Systems, 2020, 12 pages.
Hudson et al., "Learning by Abstraction: The Neural State Machine", 33rd Conference on Neural Information Processing Systems, 2019, 14 pages.

* cited by examiner

APPARATUS AND METHOD FOR COMPOSITIONAL SPOKEN LANGUAGE UNDERSTANDING

CROSS-REFERENCE TO RELATED APPLICATION AND PRIORITY CLAIM

This application claims priority under 35 U.S.C. § 119(e) to U.S. Provisional Patent Application No. 63/190,695 filed on May 19, 2021. This provisional application is hereby incorporated by reference in its entirety.

TECHNICAL FIELD

This disclosure relates generally to machine learning systems. More specifically, this disclosure relates to an apparatus and method for compositional spoken language understanding (SLU).

BACKGROUND

Many mobile electronic devices and other electronic devices now support the use of voice assistant products, which allow users to interact with the electronic devices by speaking to the electronic devices and often receiving audible responses from the electronic devices. The use of voice assistant products has grown rapidly in recent years and is expected to continue growing rapidly in the future. Spoken language understanding (SLU) is a component of voice assistant products that enables the electronic devices to understand user commands and execute requested actions. For example, SLU models are typically responsible for converting user utterances into executable meaning representations, such as by identifying a domain, an intent, and one or more slot labels for each user utterance.

SUMMARY

This disclosure provides an apparatus and method for compositional spoken language understanding (SLU).

In a first embodiment, a method includes identifying multiple tokens contained in an input utterance. The method also includes generating slot labels for at least some of the tokens contained in the input utterance using a trained machine learning model. The method further includes determining at least one action to be performed in response to the input utterance based on at least one of the slot labels. The trained machine learning model is trained to use attention distributions generated such that (i) the attention distributions associated with tokens having dissimilar slot labels are forced to be different and (ii) the attention distribution associated with each token is forced to not focus primarily on that token itself.

In a second embodiment, an electronic device includes at least one processing device configured to identify multiple tokens contained in an input utterance, generate slot labels for at least some of the tokens contained in the input utterance using a trained machine learning model, and determine at least one action to be performed in response to the input utterance based on at least one of the slot labels. The trained machine learning model is trained to use attention distributions generated such that (i) the attention distributions associated with tokens having dissimilar slot labels are forced to be different and (ii) the attention distribution associated with each token is forced to not focus primarily on that token itself.

In a third embodiment, a non-transitory machine-readable medium contains instructions that when executed cause at least one processor of an electronic device to identify multiple tokens contained in an input utterance, generate slot labels for at least some of the tokens contained in the input utterance using a trained machine learning model, and determine at least one action to be performed in response to the input utterance based on at least one of the slot labels. The trained machine learning model is trained to use attention distributions generated such that (i) the attention distributions associated with tokens having dissimilar slot labels are forced to be different and (ii) the attention distribution associated with each token is forced to not focus primarily on that token itself.

In a fourth embodiment, a method includes obtaining a training dataset having training utterances. The method also includes identifying different combinations of the training utterances, where each combination has two or more training utterances with a common intent and disjoint sets of slot types. The method further includes concatenating the training utterances in each combination to generate at least one paired training sample for that combination. The method also includes adding the paired training samples to the training dataset in order to produce an augmented training dataset. In addition, the method includes training a machine learning model using the augmented training dataset.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
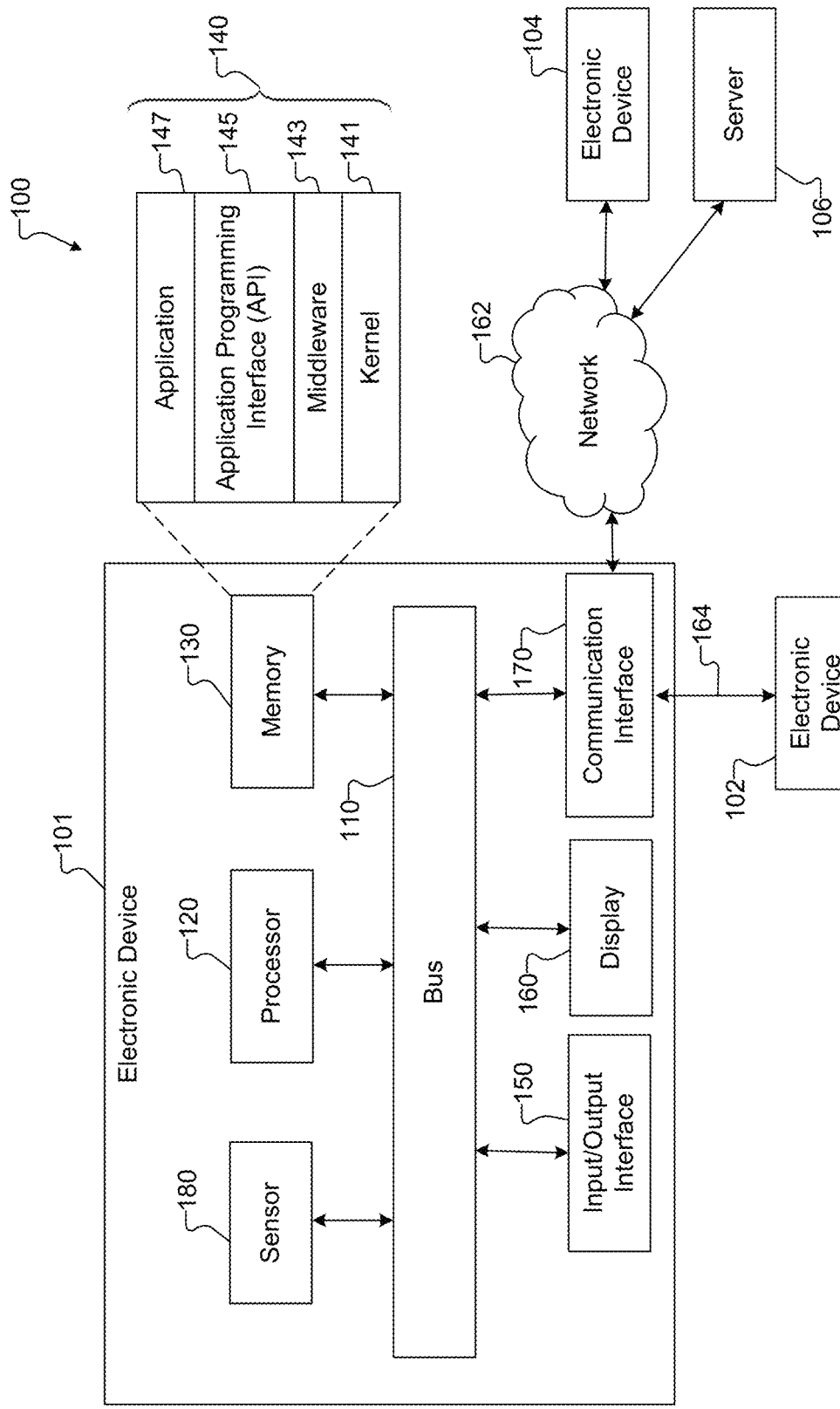
FIG. 1 illustrates an example network configuration including an electronic device in accordance with this disclosure.

FIGS. 1 through 11, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, many mobile electronic devices and other electronic devices now support the use of voice assistant products, which allow users to interact with the electronic devices by speaking to the electronic devices and often receiving audible responses from the electronic devices. The use of voice assistant products has grown rapidly in recent years and is expected to continue growing rapidly in the future. Spoken language understanding (SLU) is a component of voice assistant products that enables the electronic devices to understand user commands and execute requested actions. For example, SLU models are typically responsible for converting user utterances into executable meaning representations, such as by identifying a domain, an intent, and one or more slot labels for each user utterance.

Current state-of-the-art SLU machine learning models are often based on the use of deep neural networks. However, these SLU machine learning models can suffer from various shortcomings. Among other things, current SLU models cannot perform compositional generalization well. Compositional generalization in language understanding refers to the ability of a machine learning model to understand new complex utterances by decomposing these utterances into known sub-parts. For instance, an SLU model may be trained using utterances such as "play some rock music" and "play songs from the eighties," but the SLU model may be unable to properly understand more complex phrases like "play rock music from the eighties." Because current SLU models cannot perform compositional generalization well, training these SLU models often requires a large amount of annotated training data, which is generally expensive and time consuming to collect, particularly for domains with large numbers of intents and slots (such as airline or restaurant reservations). Moreover, these SLU models often fail when they encounter user utterances with novel combinations of slots, meaning combinations of slots not seen during training. This can result in unexpected failures of the SLU models, which creates poor user experiences after deployment of the SLU models. In addition, some parties (such as third-party skill developers) may be unable to develop high-quality SLU models to support new skills using limited annotated utterances, which negatively impacts the scalability of voice assistant products and other SLU-related products.

This disclosure provides various techniques supporting compositional spoken language understanding. As described in more detail below, a machine learning model that supports compositional SLU may be trained to support both novel utterance lengths and novel slot combinations. With respect to novel utterance lengths, an augmented training dataset can be produced by obtaining a training dataset, identifying different combinations of training utterances in the training dataset, and concatenating the training utterances in each combination to generate a paired training sample for that combination. Each combination of training utterances may include two or more training utterances with a common intent but with disjoint sets of slot types. The paired training samples can be added to the training dataset in order to produce an augmented training dataset, thereby allowing the machine learning model to be trained using utterances of various lengths. With respect to novel slot combinations, the training process for the machine learning model can attempt to minimize an objective function, and the objective function can be defined in a manner that enables the model to be generalized for new combinations of slot values. For instance, during training, the machine learning model can be trained to use attention distributions that are generated such that (i) the attention distributions associated with tokens (such as words, parts of words, or phrases) having dissimilar slot labels are forced to be different and (ii) the attention distribution associated with each token is forced to not focus primarily on that token itself. Each attention distribution generally defines how to weight the importance of other tokens in utterances in order to understand what a particular token means. The machine learning model may therefore be trained using the augmented training dataset and the objective function.

As a particular example of this, a training dataset for an SLU machine learning model may include phrases such as "show flights to Boston" (where "Boston" is a slot of type "@destination-city") and "find flights from Atlanta" (where "Atlanta" is a slot of type "@source-city"). Without compositional understanding, current SLU models may fail to identify the slots correctly in a new user utterance, such as an utterance of "show flights from Atlanta to Boston," since the two slot types (@source-city and @destination-city) never appeared together in the training dataset. The techniques described in this patent document can help to reduce or avoid these types of situations by (among other things) combining training utterances to augment the training dataset and helping the machine learning model to understand slots correctly.

Once trained, the machine learning model can be placed into use. During inferencing, multiple tokens contained in an input utterance (such as a spoken or typed input from a user) can be identified, such as tokens associated with words, parts of words, or phrases in the input utterance. The tokens can be supplied to the trained machine learning model, and the machine learning model can generate slot labels for at least some of the tokens. Each slot label can identify a particular type or category of token contained in an input utterance, such as a time, a source or departure city, a destination city, a restaurant, or other type of information. Based on the identified slot label or slot labels, it is possible to determine at least one action to be performed in response to the input utterance, and the at least one action may be invoked or otherwise performed.

In this way, SLU machine learning models can be trained using smaller amounts of annotated training data and with short training utterances having few slots. Moreover, the SLU machine learning models can be trained so that they are more robust than traditional SLU models. Among other things, the SLU machine learning models produced in accordance with this disclosure can more easily understand novel user utterances containing new combinations of slots and/or new lengths. As a result, the techniques described below can help to accelerate the growth of voice assistant products and make them more intelligent and robust. For instance, these techniques can help to increase or maximize user experiences with voice assistant products after deployment. These techniques may also be used to help speed up the creation of new skills for voice assistant products or to more quickly enable third parties to add new skills to voice assistant products.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). In some cases, the processor 120 can support the use of compositional SLU, such as by obtaining input utterances and providing the input utterances for input to a trained SLU model. The processor 120 can also perform or invoke performance of actions based on the domains/intents/slots of the input utterances as determined by the trained SLU model.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications supporting the use of compositional SLU. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some cases, the server 106 can support the use of compositional SLU, such as by training an SLU model to support both novel utterance lengths and novel slot combinations and providing the trained SLU model for use (either by the server 106 itself or an external device, such as the electronic device 101).

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
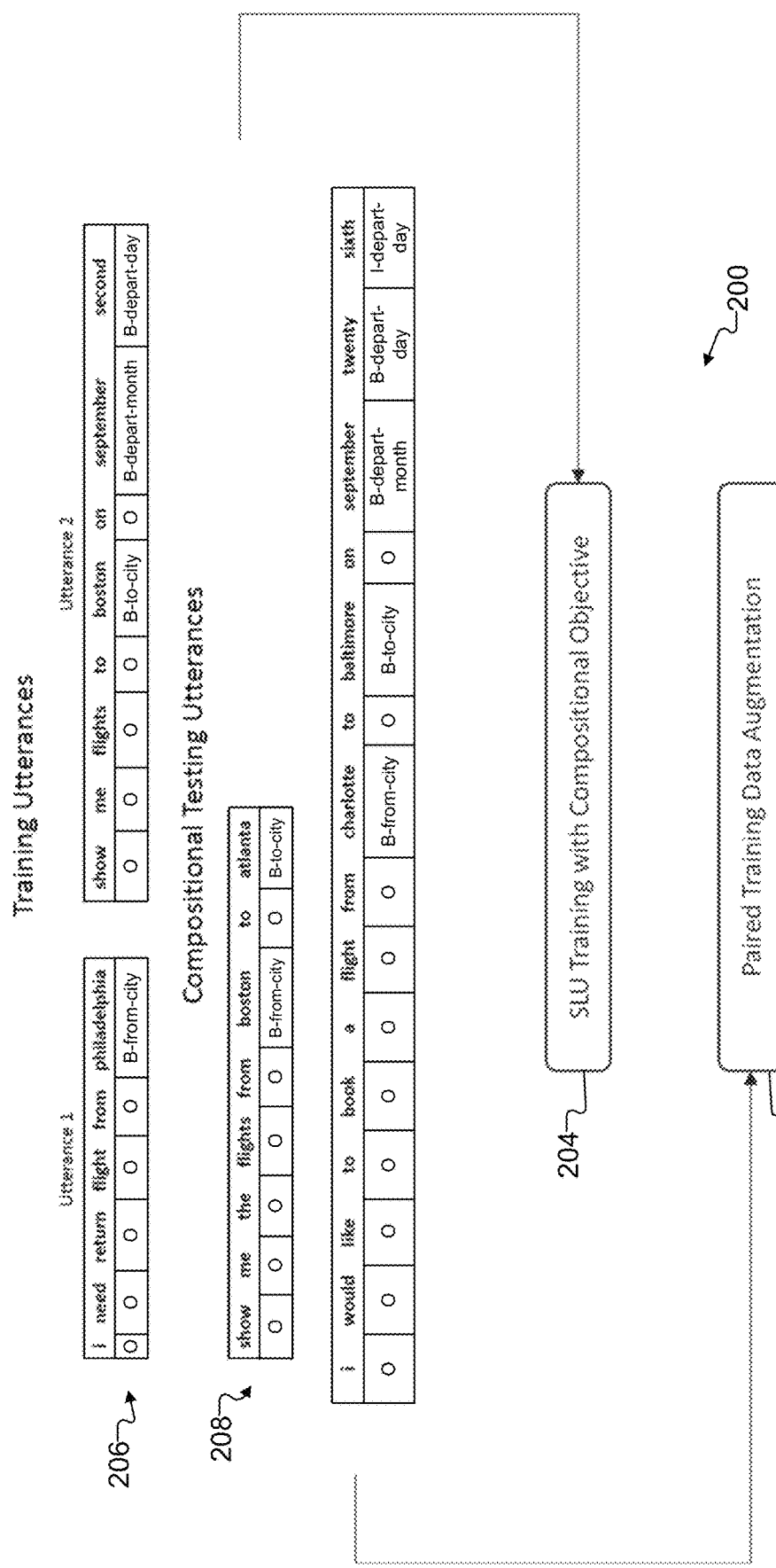
FIG. 2 illustrates example techniques for improving the training of a machine learning model to support compositional spoken language understanding (SLU) in accordance with this disclosure.

FIG. 2 illustrates example techniques 200 for improving the training of a machine learning model to support compositional SLU in accordance with this disclosure. For ease of explanation, the techniques 200 are described as being implemented or supported by the server 106 in the network configuration 100 of FIG. 1. However, the techniques 200 may be implemented or supported by any other suitable device(s) and in any other suitable system(s), such as when at least one of the techniques 200 is performed by the electronic device 101.

As shown in FIG. 2, the techniques 200 that can be supported to help improve the training of an SLU machine learning model include a paired training data augmentation process 202 and an SLU training with compositional objective process 204. These processes 202 and 204 support two types of compositional generalization. As described in more detail below, the paired training data augmentation process 202 can be used to combine training utterances in order to form longer training utterances. For instance, the paired training data augmentation process 202 may combine two or more training utterances having a common intent but having disjoint sets of slot types. This allows an SLU machine learning model to be trained to recognize utterances having novel lengths. Also, as described in more detail below, the SLU training with compositional objective process 204 trains the SLU machine learning model to be generalized and able to recognize new combinations of slot values. This allows the SLU machine learning model to be trained to recognize utterances having novel combinations of slot types that may not have appeared in any individual training utterances.

Among other things, this allows a training dataset to be obtained, where the training dataset includes multiple training utterances (such as training utterances 206). Using the processes 202 and 204, the training dataset can be augmented and an SLU machine learning model can be trained, and the trained SLU machine learning model can be tested using more complex testing utterances (such as compositional testing utterances 208). As shown in this example, the compositional testing utterances 208 can include both (i) combinations of slot types not seen in any individual training utterance 206 and (ii) utterance lengths not seen in any individual training utterance 206. Ideally, the processes 202 and 204 can be used to produce an SLU machine learning model that has been trained using the training utterances 206, where the trained SLU machine learning model will successfully be able to interpret the more-complex compositional testing utterances 208.

Although FIG. 2 illustrates examples of techniques 200 for improving the training of a machine learning model to support compositional SLU, various changes may be made to FIG. 2. For example, the training utterances 206 and the compositional testing utterances 208 shown here are for illustration only and are merely meant to illustrate how the processes 202 and 204 may be used to train an SLU model using training utterances to recognize utterances of different lengths and/or different slot combinations. The processes 202 and 204 may be used with any other suitable utterances.

Figure 3:
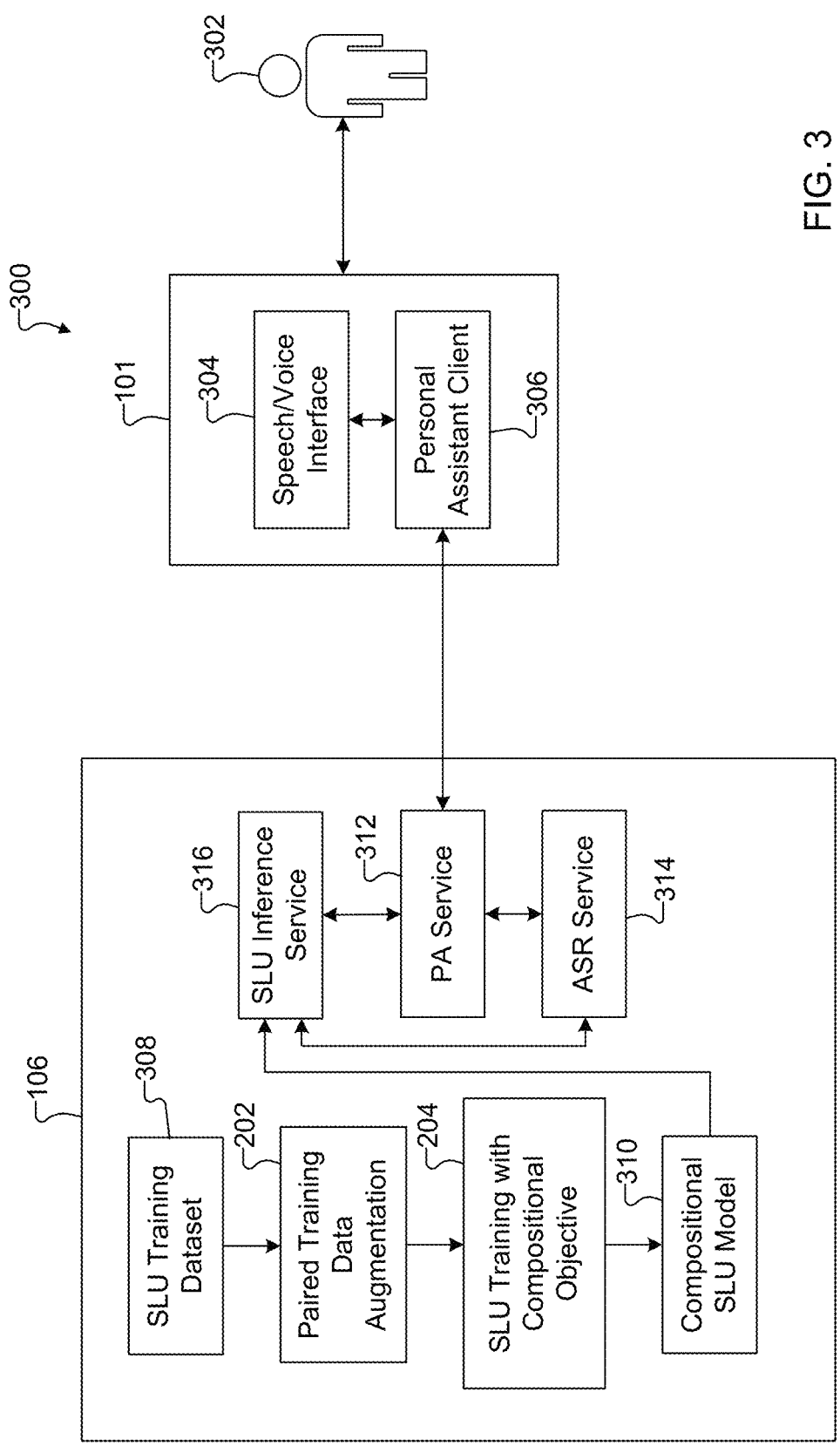
FIG. 3 illustrates an example architecture for supporting compositional SLU in accordance with this disclosure.

FIG. 3 illustrates an example architecture 300 for supporting compositional SLU in accordance with this disclosure. For ease of explanation, the architecture 300 is described as being implemented or supported by the electronic device 101 and the server 106 in the network configuration 100 of FIG. 1. However, the architecture 300 may be implemented or supported by any other suitable device(s) and in any other suitable system(s), such as when supported entirely by the electronic device 101 or entirely by the server 106.

As shown in FIG. 3, the electronic device 101 is associated with a user 302, such as a person who can provide input utterances to the electronic device 101 and optionally receive responses from the electronic device 101. The input utterances may represent any suitable utterances provided to or otherwise obtained by the electronic device 101, such as spoken words or typed text. In this example, the electronic device 101 includes or supports a speech/voice interface 304 and a digital personal assistant (PA) client 306. The speech/voice interface 304 generally operates to provide information associated with user inputs (such as spoken commands or other utterances) and to generate speech outputs (such as responses to the spoken commands or other utterances) for presentation to the user 302. The PA client 306 generally operates to provide the information associated with the user inputs to the server 106 for processing and to receive information from the server 106, such as information obtained in response to the input utterances.

In this example, the server 106 can obtain at least one SLU training dataset 308, which includes a number of training utterances. The SLU training dataset 308 may relate to any specified domain or domains and may include any suitable number of training utterances. The processes 202 and 204 can be performed using the SLU training dataset 308, which results in the creation of at least one trained compositional SLU model 310. Among other things, the SLU model 310 represents a machine learning model that has been trained to recognize input utterances having new lengths and containing new combinations of slot values (compared to the training utterances in the SLU training dataset 308). The SLU model 310 represents any suitable machine learning model that has been trained to perform spoken language understanding. In some embodiments, for instance, the SLU model 310 may be implemented using one or more neural networks. However, other types of machine learning models may be used here.

In this particular example, the trained SLU model 310 is used by a PA service 312, which can interact with the PA client 306 of one or more end-user devices (such as the electronic device 101). For example, the PA service 312 may receive data defining one or more input utterances, and the PA service 312 can provide the data to one or more suitable destinations. Here, the PA service 312 can interact with an automatic speech recognition (ASR) service 314 and an SLU inference service 316. The ASR service 314 may process the data from the electronic device 101 in order to recognize specific words and phrases spoken by the user 302. The SLU inference service 316 can perform inferencing using the trained compositional SLU model 310 in order to identify the intents and slot labels associated with input utterances provided by the electronic device 101.

Example operations of the paired training data augmentation process 202, the SLU training with compositional objective process 204, and the SLU inference service 316 are provided below. Effectively, these components allow the server 106 to obtain at least one intelligent and robust compositional SLU model 310 and to use the SLU model 310 to more effectively understand input utterances. The intents and slot labels determined using the SLU model 310 may be used in any suitable manner, such as being used (by the server 106, electronic device 101, or other device) to identify one or more actions to be performed in response to each input utterance and to perform or invoke performance of the one or more actions in order to satisfy each input utterance. Note that, depending on the action(s) identified, each action may be performed by the electronic device 101, by the server 106, or by at least one other device in communication with the electronic device 101 or the server 106.

It should be noted that the functions shown in or described with respect to each of the server 106 and the electronic device 101 can be implemented in any suitable manner. For example, in some embodiments, at least some of the functions shown in or described with respect to the server 106 or the electronic device 101 can be implemented or supported using one or more software applications or other software instructions that are executed by the processor 120 of the server 106 or the electronic device 101. In other embodiments, at least some of the functions shown in or described with respect to the server 106 or the electronic device 101 can be implemented or supported using dedicated hardware components. In general, the functions shown in or described with respect to FIG. 3 can be performed using any suitable hardware or any suitable combination of hardware and software/firmware instructions.

Although FIG. 3 illustrates one example of an architecture 300 for supporting compositional SLU, various changes may be made to FIG. 3. For example, the architecture 300 may be used with any other suitable device(s) and does not need to be implemented using the electronic device 101 and the server 106. Also, the compositional SLU model 310 may be used in any other suitable manner and is not limited to use with the specific server 106, the specific electronic device 101, and the specific application shown here.

Figure 4:
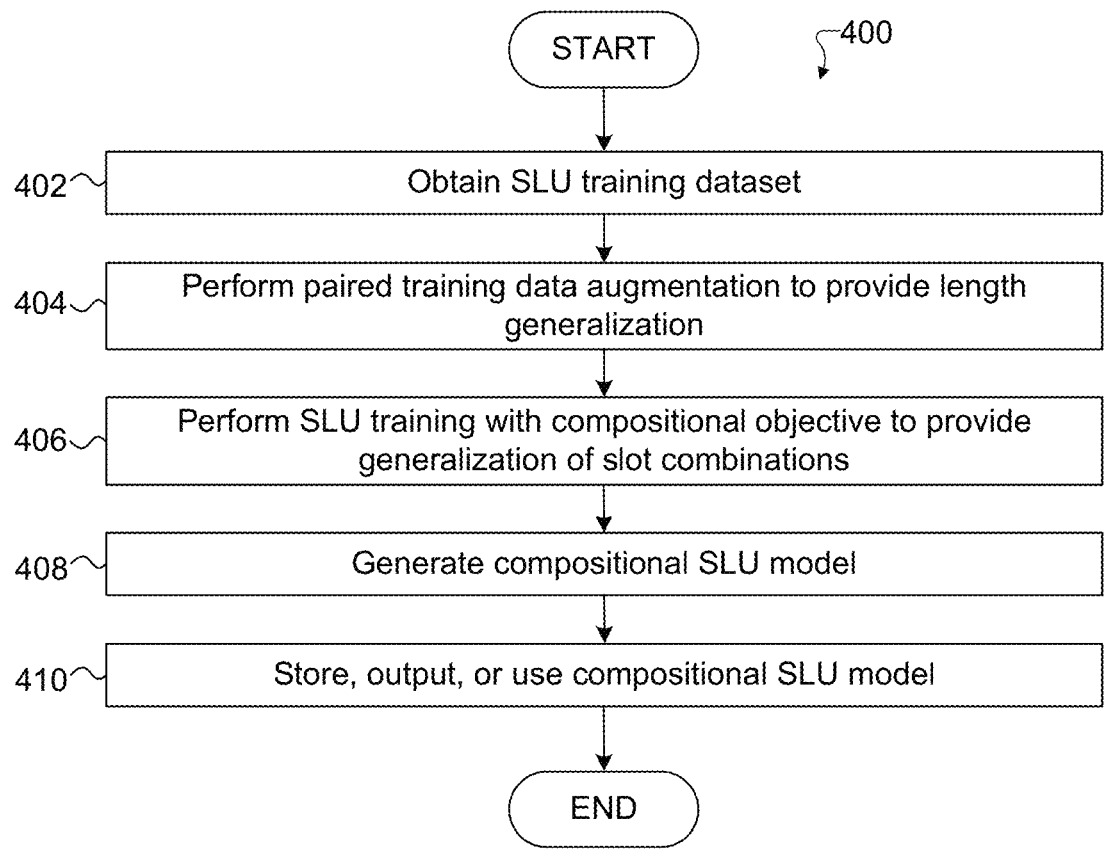
FIG. 4 illustrates an example method for generating a machine learning model that supports compositional SLU in accordance with this disclosure.

FIG. 4 illustrates an example method 400 for generating a machine learning model that supports compositional SLU in accordance with this disclosure. For ease of explanation, the method 400 is described as being performed by the server 106 in the network configuration 100 of FIG. 1. However, the method 400 may be performed by any other suitable device(s) and in any other suitable system(s), such as when performed by the electronic device 101.

As shown in FIG. 4, an SLU training dataset is obtained at step 402. This may include, for example, the processor 120 of the server 106 obtaining the SLU training dataset 308 from an internal or external storage. In some cases, the SLU training dataset 308 may be generated as described below using a publicly-available dataset. In those or other embodiments, some utterances in an initial dataset may be selected for use as the SLU training dataset 308, and other utterances in the initial dataset may be selected for use as a testing dataset. However, the SLU training dataset 308 may be obtained in any other suitable manner.

Paired training data augmentation is performed to provide length generalization at step 404. This may include, for example, the processor 120 of the server 106 performing the paired training data augmentation process 202, which can combine training utterances having a common intent but disjoint sets of slot types to generate additional training utterances. The additional training utterances can be added to the SLU training dataset to produce an augmented SLU training dataset.

SLU training with compositional objective is performed to provide generalization of slot combinations at step 406. This may include, for example, the processor 120 of the server 106 performing the SLU training with compositional objective process 204, which can train a machine learning model using the augmented SLU training dataset. The SLU training with compositional objective process 204 uses an objective function that helps the trained machine learning model learn to recognize novel slot combinations (compared to the SLU training dataset 308). The presence of the additional training utterances in the augmented SLU training dataset helps the trained machine learning model learn to recognize novel utterance lengths (compared to the SLU training dataset 308). In some embodiments, the machine learning model can be trained sequentially using different training data, such as once to learn slot combination generalization and again to learn length generalization (or vice versa). In other embodiments, the machine learning model can be trained using the same training data to learn both slot combination generalization and length generalization.

The training of the machine learning model leads to the generation of a compositional SLU model at step 408. This may include, for example, the processor 120 of the server 106 performing the SLU training with compositional objective process 204 until weights or other parameters of the machine learning model produce a loss value below a threshold. In some cases, the training may stop even in the absence of this condition being met, such as after a specified amount of time has elapsed or after a specified number of training iterations have occurred. The end result of the training is ideally a compositional SLU model 310 that has been trained to recognize the intents and slot labels for the training utterances and the additional training utterances contained in the augmented training dataset. The compositional SLU model is stored, output, or used in some manner at step 410. This may include, for example, the processor 120 of the server 106 providing the compositional SLU model 310 to the SLU inference service 316 for use during inferencing, such as during processing of input utterances received from one or more end-user devices.

Although FIG. 4 illustrates one example of a method 400 for generating a machine learning model that supports compositional SLU, various changes may be made to FIG. 4. For example, while shown as a series of steps, various steps in FIG. 4 may overlap, occur in parallel, occur in a different order, or occur any number of times.

Figure 5:
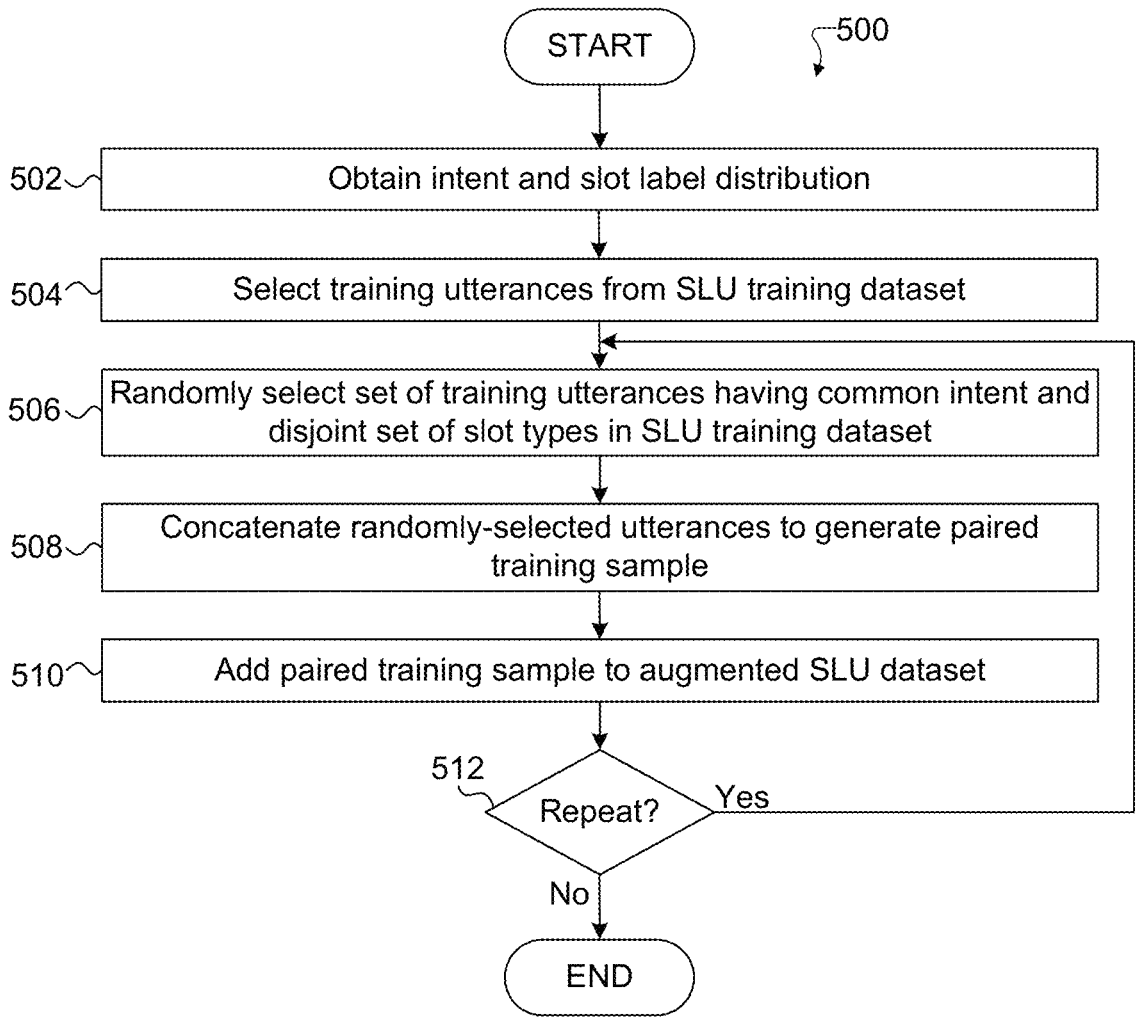
FIG. 5 illustrates an example method for performing training data augmentation in accordance with this disclosure.

FIG. 5 illustrates an example method 500 for performing training data augmentation in accordance with this disclosure. The method 500 may, for example, be performed during or as part or all of step 404 in the method 400 of FIG. 4. For ease of explanation, the method 500 is described as being performed by the server 106 in the network configuration 100 of FIG. 1. However, the method 500 may be performed by any other suitable device(s) and in any other suitable system(s), such as when performed by the electronic device 101.

As shown in FIG. 5, an intent and a slot label distribution are obtained at step 502, and training utterances from an SLU training dataset are selected at step 504. This may include, for example, the processor 120 of the server 106 obtaining a desired intent and a desired set of slot labels to be included in the SLU training dataset 308. This may also include the processor 120 of the server 106 selecting training utterances from a larger dataset with the same or similar intent and the same slot labels. Note that these steps 502 and 504 are optional since the SLU training dataset 308 may be designed or previously created to be associated with one or more known intents and a known slot label distribution.

A set of two or more training utterances is randomly selected from the SLU training dataset at step 506. This may include, for example, the processor 120 of the server 106 randomly selecting two or more training utterances from the SLU training dataset 308, where the two or more training utterances are directed to the same general intent (such as playing music, making an airline or restaurant reservation, or performing some other function) and have different sets of slot types (such as one or more slot types that differ). The selected training utterances are concatenated to generate at least one paired training sample at step 508. This may include, for example, the processor 120 of the server 106 concatenating the two or more selected training utterances into a combined utterance, such as one with a period or other punctuation between adjacent training utterances. Depending on the implementation, the processor 120 may generate a single combined utterance or multiple combined utterances, which may be generated by concatenating the two or more selected training utterances in different orders. The at least one paired training sample is added to an augmented dataset at step 510. This may include, for example, the processor 120 of the server 106 adding the paired training sample(s) to the original SLU training dataset 308.

A decision is made whether to repeat and generate one or more additional training utterances at step 512. This may include, for example, the processor 120 of the server 106 determining whether an adequate number of additional training utterances have been generated and added to the augmented dataset. This may also include the processor 120 of the server 106 determining if any remaining random sets of utterances can be selected from the SLU training dataset 308. If the decision is made to repeat, the process returns to step 506 to select another random set of utterances. Otherwise, the process can end.

Although FIG. 5 illustrates one example of a method 500 for performing training data augmentation, various changes may be made to FIG. 5. For example, while shown as a series of steps, various steps in FIG. 5 may overlap, occur in parallel, occur in a different order, or occur any number of times. Also, training data augmentation may occur in any other or additional manner to create additional training data.

Figure 6:
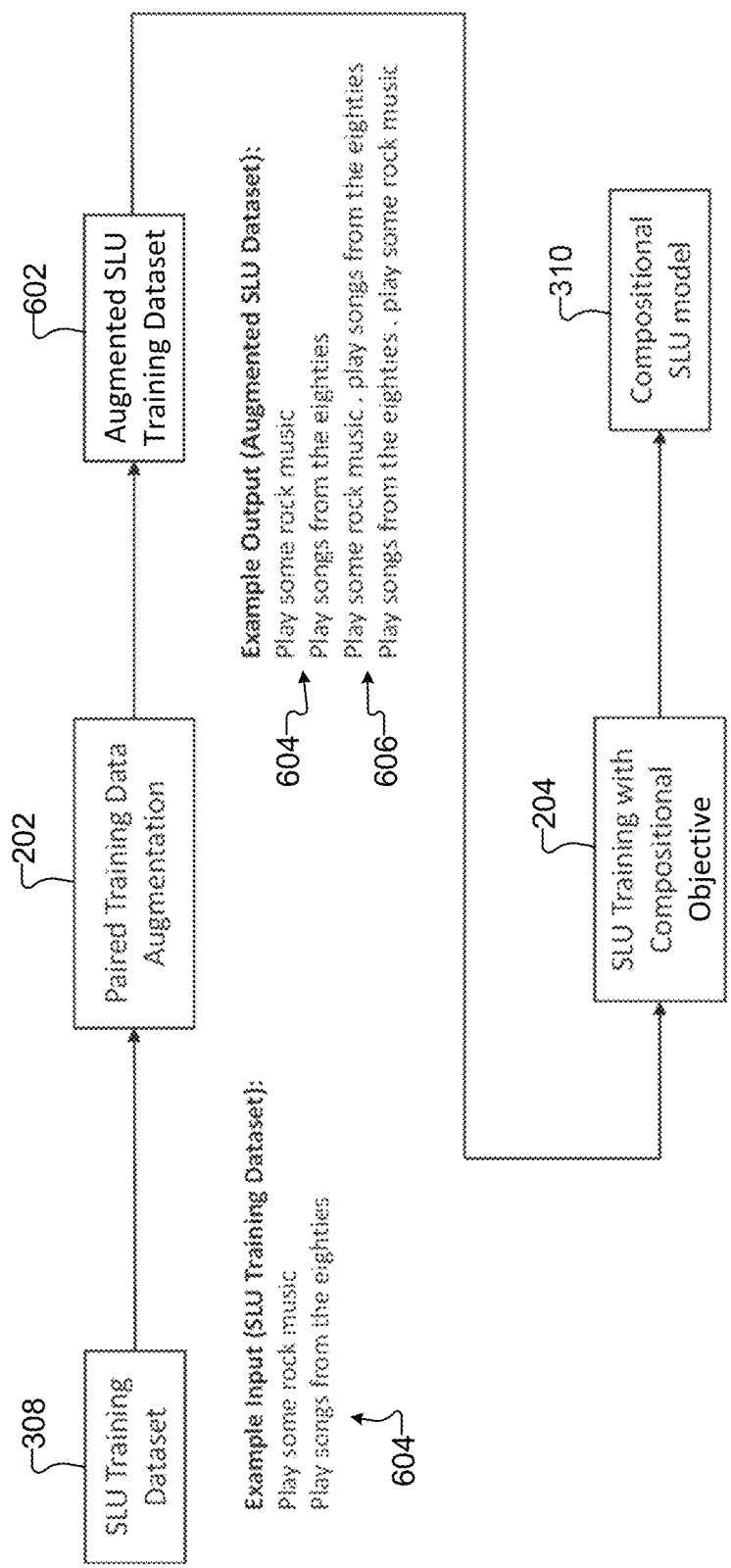
FIG. 6 illustrates an example training data augmentation to support training of a machine learning model for compositional SLU in accordance with this disclosure.

FIG. 6 illustrates an example training data augmentation 600 to support training of a machine learning model for compositional SLU in accordance with this disclosure. More specifically, FIG. 6 illustrates a specific example use of the paired training data augmentation process 202, which can be used to generate an augmented SLU training dataset 602 based on an SLU training dataset 308 as described above with respect to FIG. 5. As can be seen in this example, the SLU training dataset 308 includes various training utterances 604. In this example, the training utterances 604 are relatively short and include a relatively low number of slot types per training utterance 604. The paired training data augmentation process 202 here operates to combine training utterances 604 that are determined to be associated with a common intent but have disjoint sets of slot types. This means that the paired training data augmentation process 202 can determine when different training utterances 604 are associated with a common intent but have sets of slot types that are not identical. In this case, the paired training data augmentation process 202 can determine that the training utterances 604 are both associated with a common intent (playing music). The paired training data augmentation process 202 can also determine that the training utterances 604 have disjoint sets of slot types since the first training utterance 604 includes a slot type (music genre) not included in the second training utterance 604 and the second training utterance 604 includes a slot type (year) not included in the first training utterance 604.

Based on this determination, the paired training data augmentation process 202 can generate one or more paired training samples that form one or more additional training utterances 606. In this example, two additional training utterances 606 are formed by concatenating the two training utterances 604 in two ways (first training utterance 604 followed by second training utterance 604 and second training utterance 604 followed by first training utterance 604). However, a single additional training utterance 606 may be formed rather than two when two or more training utterances 604 are identified as having a common intent and disjoint sets of slot types. Also, more than two additional training utterances 606 may be formed if three or more training utterances 604 are identified as having a common intent and disjoint sets of slot types. In general, two or more training utterances 604 may be concatenated in one or multiple ways in order to form one or multiple additional training utterances 606.

The additional training utterance(s) 606 can be added to the SLU training dataset 308 in order to generate the augmented SLU training dataset 602. This supports the training of the compositional SLU model 310 using utterances having longer lengths than the two training utterances 604 themselves, which supports the recognition of novel utterance lengths. As described below, the augmented SLU training dataset 602 can be used by the SLU training with compositional objective process 204 during training, and the training can help the compositional SLU model 310 learn to recognize novel slot combinations (compared to the slot combinations contained in the utterances of the augmented SLU training dataset 602).

Although FIG. 6 illustrates one example of a training data augmentation 600 to support training of a machine learning model for compositional SLU, various changes may be made to FIG. 6. For example, the additional training utterances 604 and 606 shown here are for illustration only and are merely meant to illustrate how the process 202 may generate augmented training data for use in training an SLU model. The process 202 may be used with any other suitable utterances.

Figure 7:
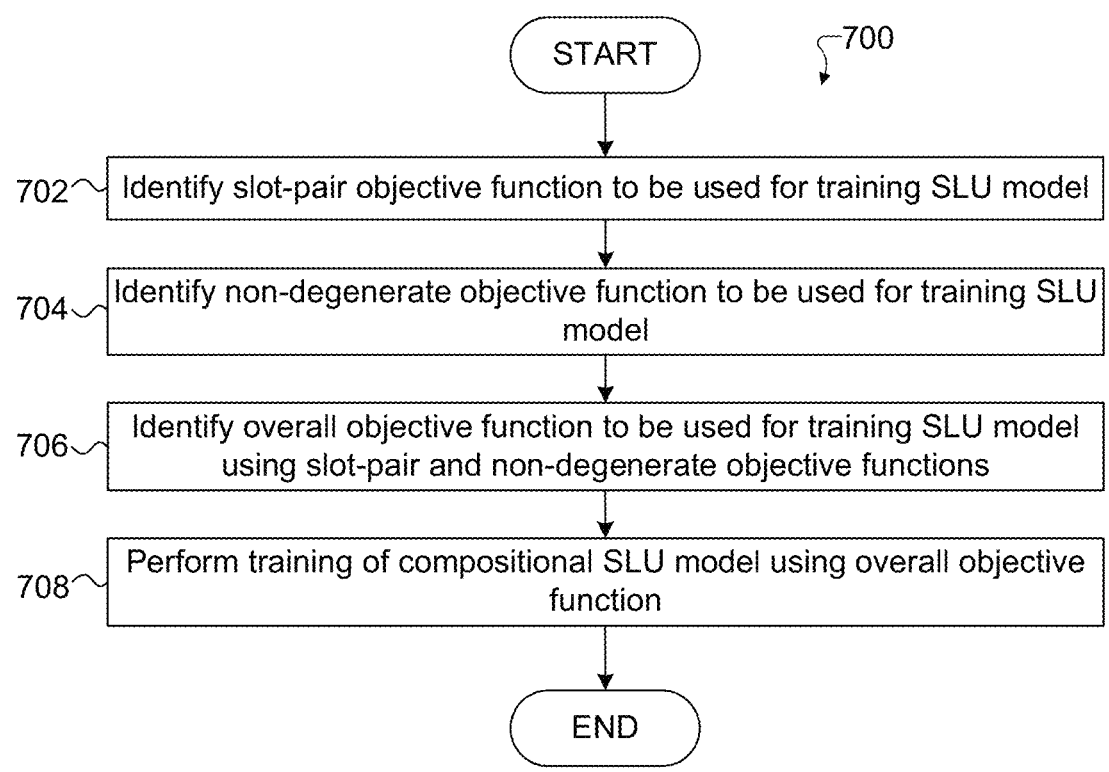
FIG. 7 illustrates an example method for performing SLU model training with compositional objective in accordance with this disclosure.

FIG. 7 illustrates an example method 700 for performing SLU model training with compositional objective in accordance with this disclosure. The method 700 may, for example, be performed during or as part or all of step 406 in the method 400 of FIG. 4. For ease of explanation, the method 700 is described as being performed by the server 106 in the network configuration 100 of FIG. 1. However, the method 700 may be performed by any other suitable device(s) and in any other suitable system(s), such as when performed by the electronic device 101.

Current deep neural network-based SLU models can sometimes base their decisions on spurious correlations between slots instead of actually learning true compositionality. For example, assume a traditional SLU model is being trained with a training utterance of "play rock from the eighties." During training, the traditional SLU model may be trained to use an attention distribution for the word "rock" that gives the highest weight to the word "eighties," and the traditional SLU model may be trained to use an attention distribution for the word "eighties" that gives the highest weight to the word "rock." This indicates improper learning since the traditional SLU model is not being trained to understand "rock" and "eighties" and is instead being trained to learn an association between the words "rock" and "eighties." As a result, the traditional SLU model can fail if one of these words appears without the other in an input utterance containing a novel slot combination. The SLU training with compositional objective process 204 may be used to train the compositional SLU model 310 more appropriately. For instance, the compositional SLU model 310 can be trained to use an attention distribution for the word "rock" that gives the highest weight to the word "play," and the compositional SLU model 310 may be trained to use an attention distribution for the word "eighties" or the phrase "the eighties" that gives the highest weight to the word "play." This indicates that the compositional SLU model 310 is less dependent on slot correlations and learns better compositionality.

As shown in FIG. 7, a slot-pair objective function to be used for training an SLU model is identified at step 702, and a non-degenerate objective function to be used for training the SLU model is identified at step 704. An overall objective function to be used for training the SLU model is identified using the slot-pair objective function and the non-degenerate objective function at step 706. This may include, for example, the processor 120 of the server 106 performing the SLU training with compositional objective process 204 to identify these objective functions. The objective functions may be identified in any suitable manner, such as by receiving input from one or more engineers or other personnel. Note that while shown as being separate steps, steps 702-706 may be combined, such as when a user provides the overall objective function that includes the slot-pair objective function and the non-degenerate objective function. Training of a machine learning model is performed using the overall objective function at step 708. This may include, for example, the processor 120 of the server 106 performing the SLU training with compositional objective process 204 to adjust weights or other parameters of the machine learning model until a loss value determined using the overall objective function obtains a suitable value.

In some embodiments, the objective functions used here may be defined as follows. With respect to the slot-pair objective function, let $P_i^h$ represent the self-attention distribution of a final neural network layer in the SLU model 310, which corresponds to the $i^{th}$ token and the $h^{th}$ attention head in the SLU model 310. One example of a slot-pair objective function that may be used can be defined as follows:

$$\mathcal{L}_{slot-pair} = \frac{1}{N_1} \sum_h \sum_{i,j: y_i \neq y_j \neq 0} KL(P_i^h, P_j^h) \quad (1)$$

Here, $y_i$ and $y_j$ respectively represent slot labels corresponding to $i^{th}$ and $j^{th}$ tokens, KL(•) represents a Kullback-Leibler (KL) divergence, and $N_1$ represents a normalizing constant. Also, $\mathcal{L}_{slot-pair}$ represents a loss defined by the slot-pair objective function. The objective function in Equation (1) computes the average pairwise KL distance between the attention distributions of tokens with dissimilar slot labels (meaning $y_i \neq y_j \neq 0$). Increasing the loss value here indicates that the attention distributions of dissimilar slot labels tend to be different, so the SLU model 310 learns to focus more on informative words in input utterances (rather than on other slots). This helps to reduce slot correlations and improve compositionality.

With respect to the non-degenerate objective function, the non-degenerate objective function is used to prevent each attention distribution from converging to a degenerate solution (meaning a solution where a token only focuses on itself). One example of a non-degenerate objective function that may be used can be defined as follows:

$$\mathcal{L}_{non-deg} = \frac{1}{N_2} \sum_h \sum_{i: y_i \neq 0} KL(P_i^h, 1_i) \quad (2)$$

Here, $1_i$ represents a degenerate distribution with a value of "1" for the $i^{th}$ token and a value of "0" elsewhere. Also, $N_2$ represents a normalizing constant, and $\mathcal{L}_{non-deg}$ resents a loss defined by the non-degenerate objective function. The objective function in Equation (2) computes the average KL distance between a self-attention distribution of each token ($y_i \neq 0$) and its corresponding degenerate distribution. Increasing the loss value here indicates that the attention distributions of various tokens will converge to non-degenerate solutions. In other words, Equation (2) forces the attention distribution of a specific token to not focus primarily on that token itself, which means that the most attention defined by the attention distribution for each token is not on that token itself.

Based on this, the overall objective function used to train an SLU model 310 can be defined. One example of an overall objective function that may be used can be defined as follows:

$$\mathcal{L} = \mathcal{L}_{intent} + \lambda_1 \mathcal{L}_{slot} - \lambda_2 \mathcal{L}_{slot-pair} - \lambda_3 \mathcal{L}_{non-deg} \quad (3)$$

Here, $\mathcal{L}_{intent}$ represents an intent classification loss, which refers to the loss determined when the SLU model 310 identifies an incorrect intent. Similarly, $\mathcal{L}_{slot}$ represents a slot tagging loss, which refers to the loss determined when the SLU model 310 identifies one or more incorrect slot tags (slot labels). In addition, $\lambda_1$, $\lambda_2$, and $\lambda_3$ represent hyper-parameters used during training, and $\mathcal{L}$ represents the total loss. During training, the SLU training with compositional objective process 204 can use the objective function in Equation (3) and attempt to modify weights or other parameters of a machine learning model so that the total loss $\mathcal{L}$ is reduced below a threshold value or otherwise minimized.

One example of the effects of this type of approach can be seen in the following example. Assume the SLU training dataset 308 includes the utterance "show me flights from Boston to Atlanta." Here, two slots "Boston" and "Atlanta" are respectively associated with two slot types "@source-city" and "@destination-city." For two slots of dissimilar slot labels/types, the minimum set of words needed to properly identify the slot label of each slot should be different (the set of words is referred to as a "slot support set"). In this example, the slot support set for "Boston" may be defined as $S_{Boston}$={show, flights, from, Boston}, and the slot support set for "Atlanta" may be defined as $S_{Atlanta}$={show, flights, to, Atlanta}. These support sets are different since Boston has the slot label @source-city and Atlanta has the slot label @destination-city. Since the SLU model 310 should (ideally) infer each slot label on the basis of its slot support set, the self-attention distributions corresponding to dissimilar slot labels should also be different. The objective functions defined above explicitly encourage the generation of such dissimilar attention distributions for use by the SLU model 310, thereby improving the SLU model's compositionality while avoiding the generation of degenerate distributions.

Although FIG. 7 illustrates one example of a method 700 for performing SLU model training with compositional objective, various changes may be made to FIG. 7. For example, while shown as a series of steps, various steps in FIG. 7 may overlap, occur in parallel, occur in a different order, or occur any number of times. Also, any other suitable objective function(s) may be used here to achieve a desired loss while helping to obtain slot combination generalization and length generalization.

Figure 8:
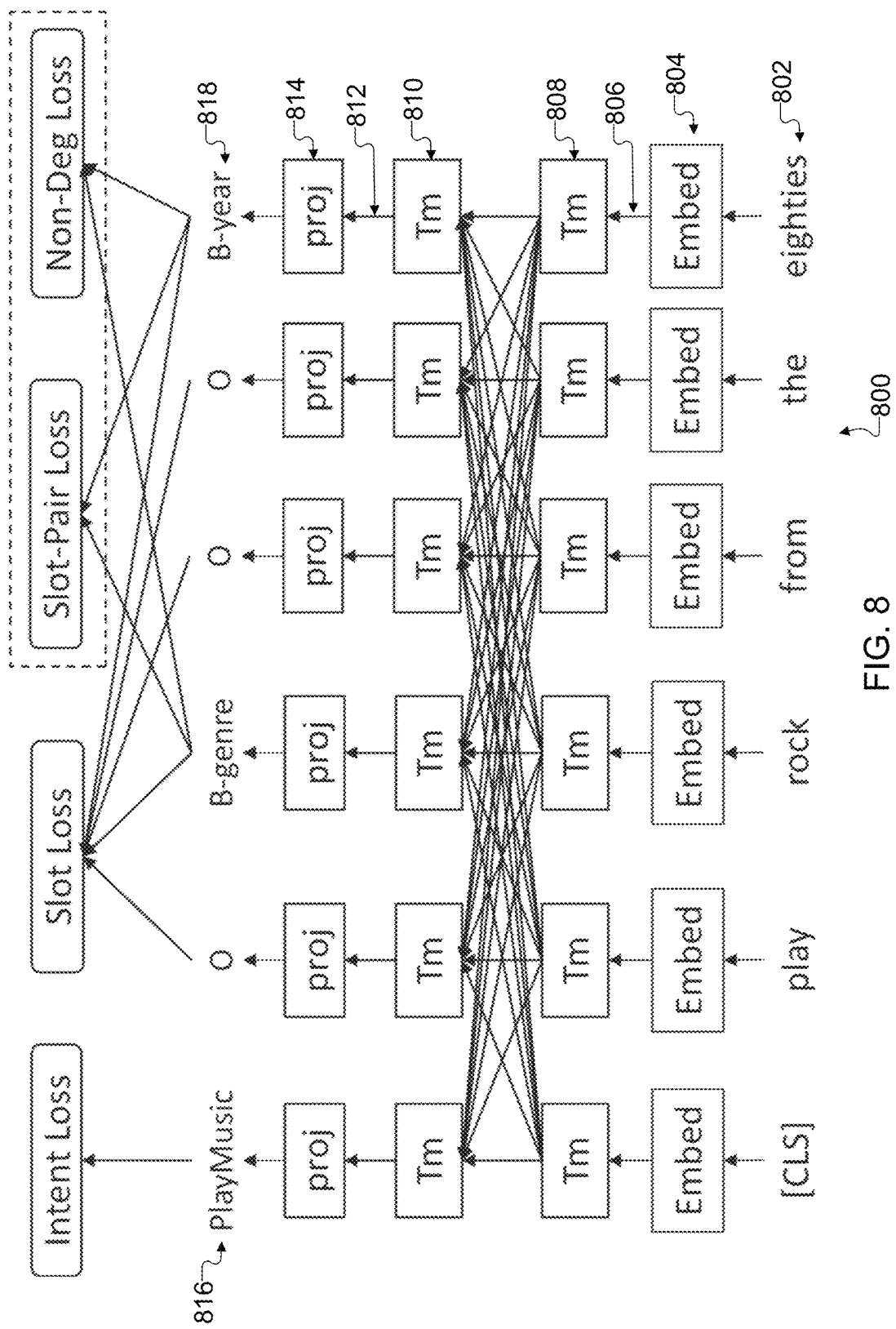
FIG. 8 illustrates an example use of a machine learning model to perform compositional SLU in accordance with this disclosure.

FIG. 8 illustrates an example use 800 of a machine learning model to perform compositional SLU in accordance with this disclosure. More specifically, FIG. 8 illustrates a specific example of how a machine learning model may be structured and how loss values may be determined for the machine learning model during training by the SLU training with compositional objective process 204. As can be seen in this example, the machine learning model obtains a set of tokens 802 associated with an input utterance being processed. The tokens 802 here include individual words of the input utterance and a marker ([CLS]) identifying the start of the input utterance. The tokens 802 may be generated in any suitable manner and by any suitable component, such as when the tokens 802 are generated by the ASR service 314.

The machine learning model in this example is structured as a transformer-based neural network. In this particular example embodiment, the tokens 802 are provided to an embedding layer 804, which converts each token 802 into a corresponding vector 806. The embedding layer 804 may use any suitable technique to generate vectors 806 representing tokens 802, such as by using a vocabulary-to-embedding vector lookup table. The vectors 806 in this example are provided to multiple layers 808 and 810 of transformer neural network blocks. The transformer neural network blocks generally operate to process the vectors 806 representing the tokens 802 in order to generate word vector embeddings (representing the tokens 802 themselves as vectors) and positional encodings (representing the positions of the tokens 802 in a sentence as vectors). Encoders and decoders used in the machine learning model support the use of attention mechanisms, which allow the processing of one token 802 to include relevant data from one or more other tokens 802 while masking one or more additional tokens 802 containing irrelevant information.

The outputs from the layer 810 can represent vectors 812, and the vectors 812 are provided to a projection layer 814. The projection layer 814 converts the vectors 812 into probability distributions over the possible slot labels, meaning each probability distribution includes a probability that the corresponding token 802 is associated with a particular slot label. The probabilities can be processed (such as by using a softmax function) to select a final intent prediction 816 and final slot labels 818 for the tokens 802.

During training, the intent prediction 816 is used to calculate an intent loss ($\mathcal{L}_{intent}$), such as when a large loss is associated with an incorrect intent prediction 816 and little or no loss is associated with a correct intent prediction 816. Also, all slot labels 818 are used to calculate a slot tagging loss ($\mathcal{L}_{slot}$), such as when larger losses are associated with an increasing number of incorrect slot labels 818 and little or no loss is associated with correct slot labels 818. For slot labels 818 that are not empty (non-"O" slot labels), those slot labels 818 are used to calculate the slot-pair loss ($\mathcal{L}_{slot-pair}$) and the non-degradation loss ($\mathcal{L}_{non-deg}$). These loss values can be used in the objective function of Equation (3) in order to calculate the total loss for the machine learning model during training for this particular utterance. During training, the weights or other parameters of the machine learning model can be adjusted, and the losses for multiple utterances can be summed, averaged, or otherwise used in order to determine if and when the machine learning model is adequately trained.

Although FIG. 8 illustrates one example of a use 800 of a machine learning model to perform compositional SLU, various changes may be made to FIG. 8. For example, the structure of the machine learning model shown here is for illustration only, and other types of machine learning models may be used as the SLU model 310. As particular examples, while a transformer-based neural network is shown here, the SLU model 310 may be implemented using a long short-term memory (LSTM)-based neural network or a gated recurrent unit (GRU)-based neural network. Specific types of networks that may be used here include a bidirectional encoder representations from transformers (BERT) machine learning model and an embeddings from language models (ELMo) machine learning model.

Figure 9:
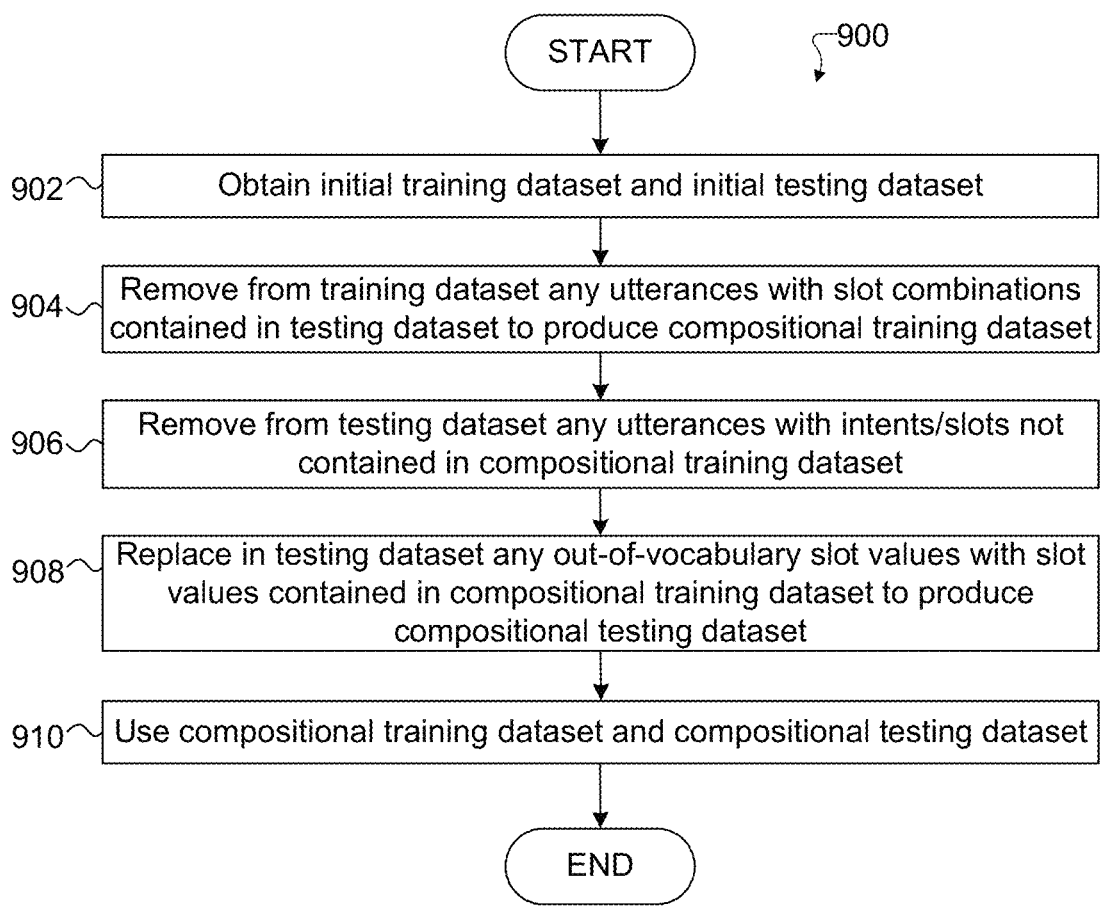
FIGS. 9 and 10 illustrate example methods for splitting a dataset into training and testing datasets to support training and testing of a machine learning model to perform compositional SLU in accordance with this disclosure.
Figure 10:
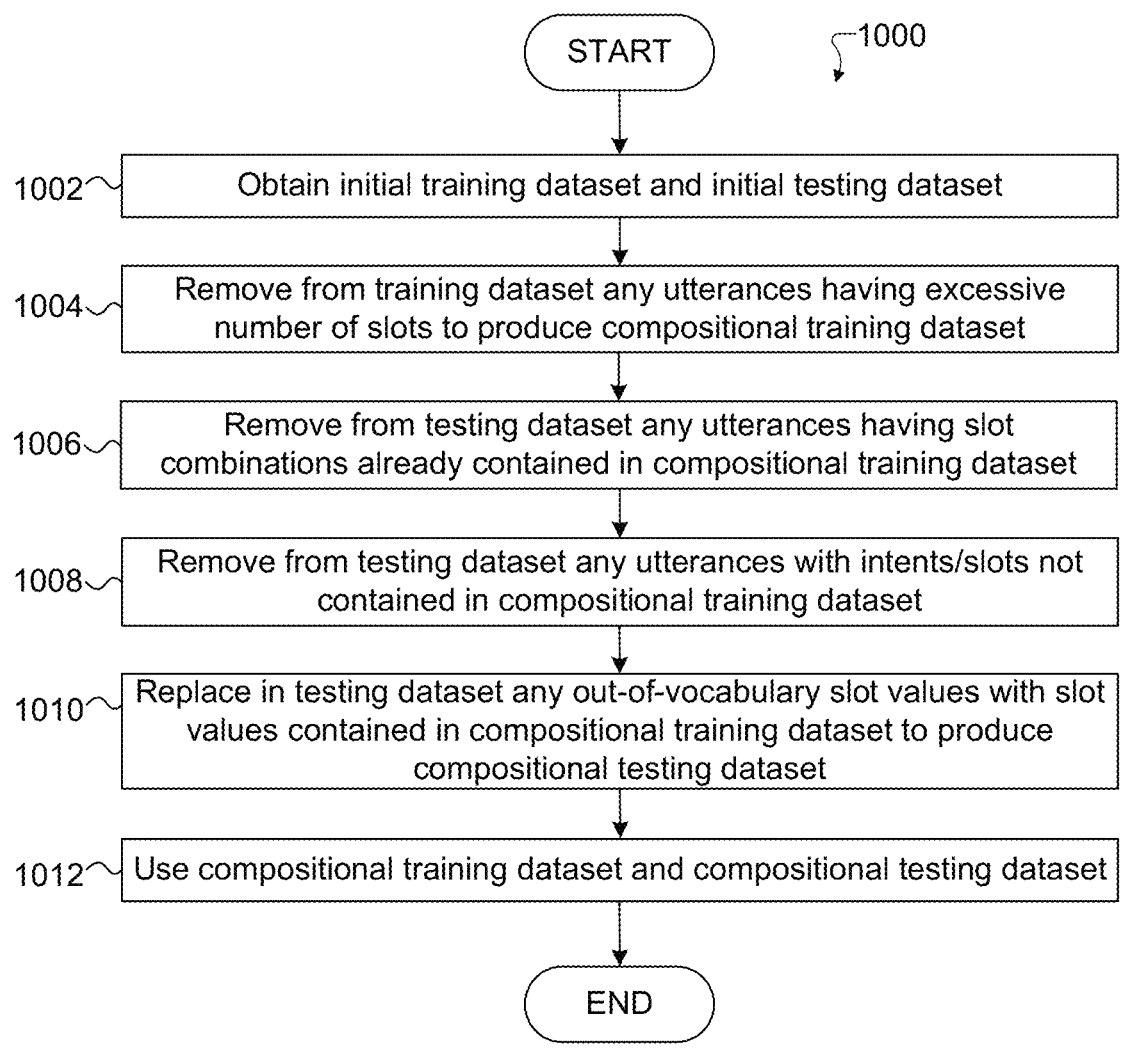

FIGS. 9 and 10 illustrate example methods 900 and 1000 for splitting a dataset into training and testing datasets to support training and testing of a machine learning model to perform compositional SLU in accordance with this disclosure. For ease of explanation, the methods 900 and 1000 are described as being performed by the server 106 in the network configuration 100 of FIG. 1. However, the methods 900 and 1000 may be performed by any other suitable device(s) and in any other suitable system(s), such as when performed by the electronic device 101.

As noted above, it is possible to obtain a large initial dataset (such as a publicly-available dataset) and divide the dataset into an SLU training dataset and an SLU testing dataset. The SLU training dataset can be used to train the compositional SLU model 310, and the testing dataset can be provided to the compositional SLU model 310 after training to see how well the SLU model 310 was trained. Splitting an initial dataset into training and testing datasets may be accomplished for other types of machine learning systems easily, such as by randomly splitting the large initial dataset into the training dataset and the testing dataset. However, for the compositional SLU model 310, this is not so simple. One purpose of training the compositional SLU model 310 is to allow the compositional SLU model 310 to learn how to handle novel utterance lengths and novel slot combinations not seen in the training data. Randomly splitting an initial dataset into training and testing datasets is likely unsuitable here, since this makes it entirely probable that the testing dataset will include utterance lengths and slot combinations also included in the training dataset. The method 900 here can be used to obtain a training dataset and a testing dataset that has novel utterance lengths compared to the training dataset. The method 1000 here can be used to obtain a training dataset and a testing dataset that has novel slot combinations compared to the training dataset. Note that while shown separately, the methods 900 and 1000 may be used together to obtain a training dataset and a testing dataset that has novel utterance lengths and novel slot combinations compared to the training dataset. This allows the SLU model 310 to be trained for slot combination generalization and length generalization separately or at the same time.

As shown in FIG. 9, an initial training dataset and an initial testing dataset are obtained at step 902. This may include, for example, the processor 120 of the server 106 obtaining a publicly-available annotated dataset or another annotated dataset having annotated utterances. Annotated utterances generally represent utterances having known (labeled) intents and known (labeled) slot types. This may also include the processor 120 of the server 106 randomly splitting the annotated dataset into the initial training dataset and the initial testing dataset, each of which may include any suitable number of annotated utterances.

Any utterances in the initial training dataset having the same slot combinations as utterances in the initial testing dataset are removed from the initial training dataset at step 904. This may include, for example, the processor 120 of the server 106 identifying the slot types in each utterance of the initial training dataset and in each utterance of the initial testing dataset. This may also include the processor 120 of the server 106 removing any utterance from the initial training dataset that has a combination of slot types matching a combination of slot types of any utterance in the initial testing dataset. This leads to the generation of a compositional training dataset, which may represent at least part of the SLU training dataset 308. This helps to ensure that the training data used to train a compositional SLU model 310 includes utterances with only some known slot combinations, while the testing data includes utterances having additional known slot combinations not used to train the SLU model 310.

Any utterances in the initial testing dataset that include an intent or at least one slot type not contained in the compositional training dataset are removed from the initial testing dataset at step 906. This may include, for example, the processor 120 of the server 106 determining if any utterance in the initial testing dataset includes an intent not associated with any utterance in the compositional training dataset or a slot type not associated with any utterance in the compositional training dataset. Also, if there are any out-of-vocabulary (OOV) slot values in the utterances of the initial testing dataset (meaning any words that are not also used in the utterances of the compositional training dataset), the OOV slot values can be replaced with slot values that are actually used in the compositional training dataset at step 908. This may include, for example, the processor 120 of the server 106 performing any suitable technique to replace one or more words in the initial testing dataset with one or more corresponding words used in the compositional training dataset. This leads to the generation of a compositional testing dataset, which may represent a testing dataset used to test the SLU model 310 after training. This helps to ensure that the testing data used to test the compositional SLU model 310 includes utterances with slot combinations not previously seen by the SLU model 310 during training.

As shown in FIG. 10, an initial training dataset and an initial testing dataset are obtained at step 1002. This may occur in the same or similar manner as step 902 described above. Note that if both methods 900 and 1000 are being performed, both methods may rely on the same initial training dataset and the same initial testing dataset.

Any utterances in the initial training dataset having an excessive number of slots are removed from the initial training dataset at step 1004. This may include, for example, the processor 120 of the server 106 identifying any utterances of the initial training dataset having a number of slots above a threshold value and removing those utterances from the initial training dataset. This leads to the generation of a compositional training dataset, which again may represent at least part of the SLU training dataset 308. This helps to ensure that the training data used to train a compositional SLU model 310 includes utterances with shorter lengths, while the testing data includes utterances having various lengths including lengths not seen by the SLU model 310 during training.

Any utterances in the initial testing dataset having the same slot combinations as utterances in the compositional training dataset are removed from the initial testing dataset at step 1006. This may occur in the same or similar manner as step 904 described above, except the training and testing datasets have been reversed. Any utterances in the initial testing dataset that include an intent or at least one slot type not contained in the compositional training dataset are removed from the initial testing dataset at step 1008. This may occur in the same or similar manner as step 906 described above. Also, if there are any OOV slot values in the utterances of the initial testing dataset that are not used in the utterances of the compositional training dataset, the OOV slot values can be replaced with slot values that are actually used in the compositional training dataset at step 1010. This may occur in the same or similar manner as step 908 described above. This leads to the generation of a compositional testing dataset, which may represent a testing dataset used to test the SLU model 310 after training. This helps to ensure that the testing data used to test the compositional SLU model 310 includes utterances with lengths not previously seen by the SLU model 310 during training.

Although FIGS. 9 and 10 illustrate examples of methods 900 and 1000 for splitting a dataset into training and testing datasets to support training and testing of a machine learning model to perform compositional SLU, various changes may be made to FIGS. 9 and 10. For example, while shown as a series of steps, various steps in each of FIGS. 9 and 10 may overlap, occur in parallel, occur in a different order, or occur any number of times. Also, training and testing datasets may be obtained in any other suitable manner.

Figure 11:
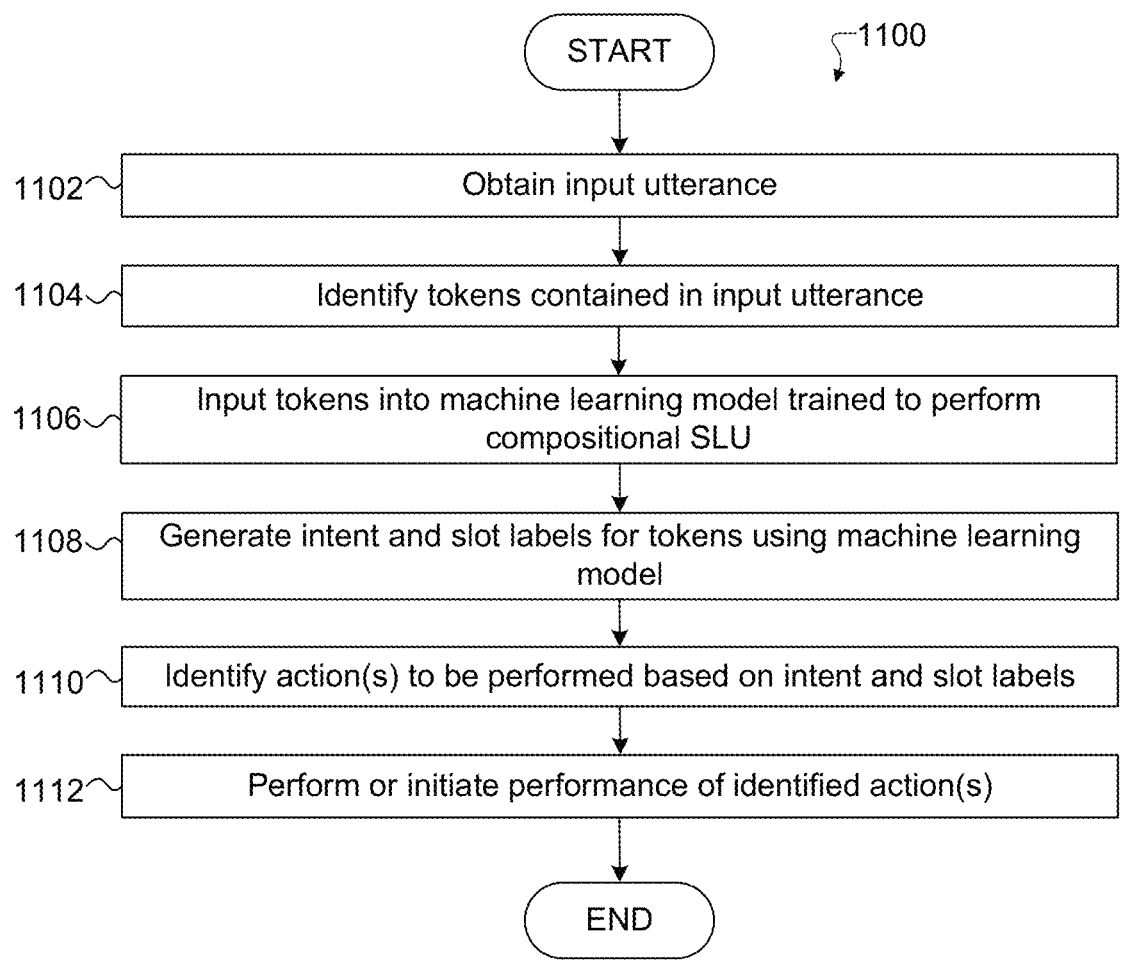
FIG. 11 illustrates an example method for performing compositional SLU using a trained machine learning model in accordance with this disclosure.

FIG. 11 illustrates an example method 1100 for performing compositional SLU using a trained machine learning model in accordance with this disclosure. For ease of explanation, the method 1100 is described as being performed by the electronic device 101 and the server 106 in the network configuration 100 of FIG. 1. However, the method 1100 may be performed by any other suitable device(s) and in any other suitable system(s), such as when performed entirely by the electronic device 101 or entirely by the server 106.

As shown in FIG. 11, an input utterance is obtained at step 1102, and tokens contained in the input utterance are identified at step 1104. This may include, for example, the electronic device 101 obtaining an input utterance from a user 302 and the electronic device 101 or the server 106 identifying the words contained in the input utterance. The tokens are input to a machine learning model that has been trained to perform compositional SLU at step 1106. This may include, for example, the processor 120 of the server 106 providing the tokens to the trained compositional SLU model 310. The SLU model 310 here has been trained to use attention distributions generated so that the attention distributions associated with tokens having dissimilar slot labels are forced to be different, such as via the use of the slot-pair objective function defined in Equation (1). The SLU model 310 here has also been trained to use attention distributions generated so that the attention distribution associated with each token is forced to not focus primarily on that token itself, such as via the use of the non-degenerate objective function defined in Equation (2). In addition, the SLU model 310 has been trained using aggregations of training utterances, which helps the model handle utterances of various lengths.

An intent and slot labels for the tokens are generated using the machine learning model at step 1108. This may include, for example, the SLU model 310 generating probability distributions, where each probability distribution identifies different probabilities that a token associated with that probability distribution should be assigned different slot labels. For a specific probability distribution, this may also include the SLU model 310 selecting the slot label associated with the highest probability or otherwise processing the probability distribution to select the slot label for the associated token.

The intent and slot labels may then be used in any suitable manner. In this example, one or more actions to be performed are identified based on the intent and slot labels at step 1110, and the one or more actions are performed or invoked at step 1112. This may include, for example, the processor 120 of the server 106 or the electronic device 101 determining at least one action to be performed based on the stated intent of the input utterance, such as playing music or making an airline or restaurant reservation. This may also include the processor 120 of the server 106 or the electronic device 101 determining how to perform the at least one action based on at least one of the slot labels, such as playing specified music, making an airline reservation for a specified day and involving specified cities, making a restaurant reservation for a specified restaurant at a specified time, or responding to a user's input utterance with a natural-language response (such as by providing an answer to a user's input question).

The operation of one example embodiment of the machine learning model during the method 1100 is actually shown in FIG. 8 and described above. That is, the SLU model 310 can receive tokens 802 associated with an input utterance and generate an intent prediction 816 and slot labels 818 using the tokens 802. While FIG. 8 shows the intent prediction 816 and slot labels 818 being used to calculate loss values, the calculation of loss values can be omitted during the method 1100. Instead, the intent prediction 816 and slot labels 818 can be used to identify the one or more actions, which may then be performed or triggered.

Although FIG. 11 illustrates one example of a method 1100 for performing compositional SLU using a trained machine learning model, various changes may be made to FIG. 11. For example, while shown as a series of steps, various steps in FIG. 11 may overlap, occur in parallel, occur in a different order, or occur any number of times. Also, a trained compositional SLU model 310 may be used in any other suitable manner.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
identifying multiple tokens contained in an input utterance;
generating slot labels for at least some of the tokens contained in the input utterance using a trained machine learning model; and
determining at least one action to be performed in response to the input utterance based on at least one of the slot labels;
wherein the trained machine learning model is trained to use attention distributions generated such that (i) the attention distributions associated with tokens having dissimilar slot labels are forced to be different and (ii) the attention distribution associated with each token is forced to not focus primarily on that token itself; and
wherein the trained machine learning model is trained using an overall objective function that includes a slot-pair objective function and a non-degenerate objective function, the slot-pair objective function defining self-attention distributions for tokens, the non-degenerate objective function preventing the self-attention distributions for the tokens from converging to a degenerate solution based on, for each token, an average Kullback-Leibler distance between the token and its corresponding degenerate distribution.

2. The method of claim 1, wherein the trained machine learning model is further trained by:
obtaining a training dataset comprising training utterances;
identifying different combinations of the training utterances, each combination having two or more training utterances with a common intent and disjoint sets of slot types;
concatenating the training utterances in each combination to generate at least one paired training sample for that combination;
adding the paired training samples to the training dataset in order to produce an augmented training dataset; and
training the machine learning model using the augmented training dataset.

3. The method of claim 1, wherein:
the slot-pair objective function is based on a first divergence between different ones of the self-attention distributions for different tokens; and
the machine learning model is trained to increase the first divergence.

4. The method of claim 3, wherein:
the non-degenerate objective function is based on a second divergence between the self-attention distribution for each token and its corresponding degenerate distribution; and
the machine learning model is trained to increase the second divergence.

5. The method of claim 4, wherein the first divergence and the second divergence comprise Kullback-Leibler (KL) divergences.

6. The method of claim 1, wherein the trained machine learning model is trained to reduce correlations between slot labels.

7. An electronic device comprising:
at least one processing device configured to:
identify multiple tokens contained in an input utterance;
generate slot labels for at least some of the tokens contained in the input utterance using a trained machine learning model; and
determine at least one action to be performed in response to the input utterance based on at least one of the slot labels;
wherein the trained machine learning model is trained to use attention distributions generated such that (i) the attention distributions associated with tokens having dissimilar slot labels are forced to be different and (ii) the attention distribution associated with each token is forced to not focus primarily on that token itself; and
wherein the trained machine learning model is trained using an overall objective function that includes a slot-pair objective function and a non-degenerate objective function, the slot-pair objective function defining self-attention distributions for tokens, the non-degenerate objective function preventing the self-attention distributions for the tokens from converging to a degenerate solution based on, for each token, an average Kullback-Leibler distance between the token and its corresponding degenerate distribution.

8. The electronic device of claim 7, wherein the trained machine learning model is further trained by:
obtaining a training dataset comprising training utterances;
identifying different combinations of the training utterances, each combination having two or more training utterances with a common intent and disjoint sets of slot types;
concatenating the training utterances in each combination to generate at least one paired training sample for that combination;
adding the paired training samples to the training dataset in order to produce an augmented training dataset; and
training the machine learning model using the augmented training dataset.

9. The electronic device of claim 8, wherein:
the slot-pair objective function is based on a first divergence between different ones of the self-attention distributions for different tokens; and
the machine learning model is trained to increase the first divergence.

10. The electronic device of claim 9, wherein:
the non-degenerate objective function is based on a second divergence between the self-attention distribution for each token and its corresponding degenerate distribution; and
the machine learning model is trained to increase the second divergence.

11. The electronic device of claim 10, wherein the first divergence and the second divergence comprise Kullback-Leibler (KL) divergences.

12. The electronic device of claim 7, wherein the trained machine learning model is trained to reduce correlations between slot labels.

13. A non-transitory machine-readable medium containing instructions that when executed cause at least one processor of an electronic device to:
identify multiple tokens contained in an input utterance;
generate slot labels for at least some of the tokens contained in the input utterance using a trained machine learning model; and
determine at least one action to be performed in response to the input utterance based on at least one of the slot labels;
wherein the trained machine learning model is trained to use attention distributions generated such that (i) the attention distributions associated with tokens having dissimilar slot labels are forced to be different and (ii) the attention distribution associated with each token is forced to not focus primarily on that token itself; and
wherein the trained machine learning model is trained using an overall objective function that includes a slot-pair objective function and a non-degenerate objective function, the slot-pair objective function defining self-attention distributions for tokens, the non-degenerate objective function preventing the self-attention distributions for the tokens from converging to a degenerate solution based on, for each token, an average Kullback-Leibler distance between the token and its corresponding degenerate distribution.

14. The non-transitory machine-readable medium of claim 13, wherein the trained machine learning model is further trained by:
obtaining a training dataset comprising training utterances;
identifying different combinations of the training utterances, each combination having two or more training utterances with a common intent and disjoint sets of slot types;
concatenating the training utterances in each combination to generate at least one paired training sample for that combination;
adding the paired training samples to the training dataset in order to produce an augmented training dataset; and
training the machine learning model using the augmented training dataset.

15. The non-transitory machine-readable medium of claim 13, wherein:
the slot-pair objective function is based on a first divergence between different ones of the self-attention distributions for different tokens; and
the machine learning model is trained to increase the first divergence.

16. The non-transitory machine-readable medium of claim 15, wherein:
the non-degenerate objective function is based on a second divergence between the self-attention distribution for each token and its corresponding degenerate distribution; and
the machine learning model is trained to increase the second divergence.

17. The non-transitory machine-readable medium of claim 13, wherein the trained machine learning model is trained to reduce correlations between slot labels.

18. A method comprising:
obtaining a training dataset comprising training utterances;
identifying different combinations of the training utterances, each combination having two or more training utterances with a common intent and disjoint sets of slot types;
concatenating the training utterances in each combination to generate at least one paired training sample for that combination;
adding the paired training samples to the training dataset in order to produce an augmented training dataset; and
training a machine learning model using the augmented training dataset;
wherein training the machine learning model comprises using an overall objective function that includes a slot-pair objective function and a non-degenerate objective function, the slot-pair objective function defining self-attention distributions for tokens, the non-degenerate objective function preventing the self-attention distributions for the tokens from converging to a degenerate solution based on, for each token, an average Kullback-Leibler distance between the token and its corresponding degenerate distribution.

19. The method of claim 18, wherein:
the slot-pair objective function is based on a first divergence between different ones of the self-attention distributions for different tokens; and
training the machine learning model comprises increasing the first divergence.

20. The method of claim 19, wherein:
the non-degenerate objective function is based on a second divergence between the self-attention distribution for each token and its corresponding degenerate distribution; and
training the machine learning model comprises increasing the second divergence.

21. The method of claim 20, wherein the first divergence and the second divergence comprise Kullback-Leibler (KL) divergences.

22. The method of claim 18, further comprising:
dividing a dataset into the training dataset and a testing dataset, the testing dataset comprising testing utterances used to test the trained machine learning model.

23. The method of claim 22, wherein dividing the dataset into the training dataset and the testing dataset comprises:
forming an initial training dataset and an initial testing dataset;
forming the training dataset used to train the machine learning model by removing any training utterances from the initial training dataset having a slot combination used in the initial testing dataset; and
forming the testing dataset used to test the machine learning model by:
removing any testing utterances from the initial testing dataset having an intent or a slot label not used in the training dataset; and
replacing any out-of-vocabulary slot values in the initial testing dataset with associated slot values used in the training dataset.

24. The method of claim 22, wherein dividing the dataset into the training dataset and the testing dataset comprises:
forming an initial training dataset and an initial testing dataset;
forming the training dataset used to train the machine learning model by removing any training utterances from the initial training dataset having a number of slots above a threshold value; and forming the testing dataset used to test the machine learning model by:

removing any testing utterances from the initial testing dataset having a slot combination used in the training dataset;

removing any testing utterances from the initial testing dataset having an intent or a slot label not used in the training dataset; and replacing any out-of-vocabulary slot values in the initial testing dataset with associated slot values used in the training dataset.

25. The method of claim 1, wherein the non-degenerate objective function is defined as:

$$\mathcal{L}_{non-deg} = \frac{1}{N_2} \sum_h \sum_{i:y_i \neq 0} KL(P_i^h, 1_i)$$

where:

$1_i$ represents a degenerate distribution with a value of "1" for an $i^{th}$ token and a value of "0" elsewhere;

$N_2$ represents a normalizing constant; and $\mathcal{L}_{non-deg}$ represents a loss defined by the non-degenerate objective function.

26. The electronic device of claim 7, wherein the non-degenerate objective function is defined as:

$$\mathcal{L}_{non-deg} = \frac{1}{N_2} \sum_h \sum_{i:y_i \neq 0} KL(P_i^h, 1_i)$$

where:

$1_i$ represents a degenerate distribution with a value of "1" for an $i^{th}$ token and a value of "0" elsewhere;

$N_2$ represents a normalizing constant; and $\mathcal{L}_{non-deg}$ represents a loss defined by the non-degenerate objective function.

27. The non-transitory machine-readable medium of claim 13, wherein the non-degenerate objective function is defined as:

$$\mathcal{L}_{non-deg} = \frac{1}{N_2} \sum_h \sum_{i:y_i \neq 0} KL(P_i^h, 1_i)$$

where:

$1_i$ represents a degenerate distribution with a value of "1" for an $i^{th}$ token and a value of "0" elsewhere;

$N_2$ represents a normalizing constant; and $\mathcal{L}_{non-deg}$ represents a loss defined by the non-degenerate objective function.

28. The method of claim 18, wherein the non-degenerate objective function is defined as:

$$\mathcal{L}_{non-deg} = \frac{1}{N_2} \sum_h \sum_{i:y_i \neq 0} KL(P_i^h, 1_i)$$

where:

$1_i$ represents a degenerate distribution with a value of "1" for an $i^{th}$ token and a value of "0" elsewhere;

$N_2$ represents a normalizing constant; and $\mathcal{L}_{non-deg}$ represents a loss defined by the non-degenerate objective function.

* * * * *